United States Patent [19]

Schloth

[11] 4,266,639
[45] May 12, 1981

[54] QUICK RESPONSE HYDRAULIC SHOCK SUPPRESSOR FOR PIPING SYSTEMS

[75] Inventor: Arthur P. Schloth, Coventry, R.I.

[73] Assignee: International Telephone and Telegraph Corporation, New York, N.Y.

[21] Appl. No.: 37,782

[22] Filed: May 10, 1979

[51] Int. Cl.³ .............................................. F16F 9/18
[52] U.S. Cl. ................................... 188/311; 188/314
[58] Field of Search ............... 116/272; 188/266, 297, 188/299, 311, 314, 318; 137/500, 503, 504

[56] References Cited

U.S. PATENT DOCUMENTS

| 887,925 | 5/1908 | Davis | 188/311 |
|---|---|---|---|
| 2,635,630 | 4/1953 | Cornelius | 116/272 X |
| 2,756,989 | 7/1956 | Peras | 188/314 X |
| 3,144,082 | 8/1964 | Grant et al. | 188/314 X |
| 3,827,537 | 8/1974 | Haller, Jr. et al. | 188/314 |

Primary Examiner—Duane A. Reger
Attorney, Agent, or Firm—John T. O'Halloran; David M. Quinlan

[57] ABSTRACT

A double-acting hydraulic cylinder has a piston disposed therein for dividing the cylinder into first and second portions with a single piston rod extending from one end of the cylinder. Each end of the hydraulic cylinder is connected to a hydraulic reservoir that is hermetically sealed and pressurized through the unique use of a metal bellows which pressurizes the hydraulic fluid. A pressure-compensated, variable orifice control valve is disposed between each end of the hydraulic cylinder and the reservoir for limiting the rate of fluid flow from the cylinder to the reservoir to a substantially constant value independent of external loads applied to the piston rod. The variable orifice increases in size with cylinder depressurization and thereby provides for a rapid release of internal residual hydraulic pressures after high dynamic loads are experienced. When used as a shock suppressor for piping systems unrestricted pipe motion is permitted in response to movement caused by thermal expansion or contraction, and pipe motion is suppressed by limiting the velocity of the pipes relative to a supporting structure during shock and oscillating load conditions. A lock-up indicator is used to provide an indication of high resistance of the device due to a lock-up condition. Radiation resistant seals are utilized throughout the device to provide for long maintenance-free periods required for nuclear applications.

35 Claims, 16 Drawing Figures

4 IPM (T) 5 Hz

Fig. 4

QUICK RESPONSE HYDRAULIC SHOCK SUPPRESSOR FOR PIPING SYSTEMS

BACKGROUND OF THE INVENTION

1. Field of the Invention

The present invention relates to hydraulic suppressors and, more particularly, to quick response hydraulic suppressors for piping systems, which suppressors resist pipe motion resulting from oscillatory or shock loads while allowing the slow movement resulting from thermal expansion and contraction.

2. Description of the Prior Art

Shock suppressors are velocity or acceleration sensitive devices which allow for the free thermal movement of piping systems or equipment but restrain movement that results from extremely high or oscillatory loads that may occur during emergency situations such as accidents, earthquakes or pipe ruptures. Such devices are commonly used in power plants and, in particular, nuclear power plants where all possible safety precautions are required. Hydraulic devices in general have been used for shock suppression; however, in recent years, the hydraulic devices have been losing acceptability in the nuclear industry due to field maintenance problems. Thermal aging of elastomeric hydraulic seals has necessitated a five-year seal replacement program, during scheduled power plant shutdowns. In addition, the temperature ranges to which such devices may be subjected has also been limited.

In an attempt to overcome the problems associated with hydraulic devices, mechanical shock suppressors have been developed as a replacement for hydraulic devices; however, these devices have also experienced problems with inconsistent operation and jamming.

A number of hydraulic and mechanical devices and combinations thereof have been proposed with varying degrees of success. U.S. Pat. No. 3,148,852 issued to E. D. Lord et al. shows a very basic fixed orifice suppressor which provides for concurrent seismic and thermal movement by the flow of fluid through the fixed orifices 26. This device does not provide a sharp break in the operational characteristic curve so that a low resistance is provided for thermal movement and a high resistance for shock movement, but rather provides increasing restraint for increasing force and would not be satisfactory for the quick response applications envisioned for the present invention.

Canadian Pat. No. 667,228 issued to P. C. Sherburne shows a hydraulic suppressor that utilizes a fixed orifice in parallel with a check valve wherein the check valve opens at a predetermined threshold pressure to protect the suppressor from overpressure conditions. U.S. Pat. No. 2,838,140 issued to M. B. Rasmusson et al and U.S. Pat. No. 3,827,537 issued to H. E. Haller, Jr. et al. each show the use of a check valve in parallel with an orifice for controlling fluid flow in a hydraulic cylinder. In these patents, the orifice is controlled by a needle valve and in the Haller, Jr. et al. patent, a more sophisticated embodiment shown in FIG. 9 discloses the use of a poppet-type valve that closes upon the application of a predetermined pressure.

U.S. Pat. No. 3,739,808 issued to L. R. Landherr shows a hydraulic suppressor utilizing a pressure-responsive spool valve which closes under a predetermined pressure to cut off the hydraulic fluid flow and thereby suppresses further motion. U.S. Pat. Nos. 3,561,574 and 3,572,363 issued to H. R. Dickinson, Jr. et al. and D. E. Roach show devices utilizing series connections of fixed orifices, one orifice being smaller than the other for controlling fluid flow. The smaller orifice is normally bypassed to allow free movement resulting from thermal expansion and contraction and minor shocks. When large shocks above a predetermined level are sensed, the bypass around the small orifice is closed forcing the hydraulic fluid through the small orifice, thereby suppressing the larger shocks.

U.S. Pat. No. 3,547,236 issued to G. Leisegang, U.S. Pat. No. 3,827,537 issued to H. E. Haller, H. F. Huettner and E. E. Martin Jr., and U.S. Pat. Nos. 3,106,992 and 3,702,646 both issued to P. C. Sherburne disclose the use of pressure-responsive valves in conjunction with fixed bypass orifices in hydraulic suppressors. The Leisegang and Sherburne '646 patents show the use of poppet-type valves which normally remain open to allow a free flow of fluid to and from the cylinder but close upon the sensing of a predetermined pressure, thereby restricting movement of the piston and the cylinder. On closure of the poppet-type valves, a bleed orifice is provided to permit some continued motion and to vent the pressure behind the poppet valve to allow a subsequent opening after the pressure is reduced. Considering this type of device, which is the most commonly used in the systems today, it is apparent that the suppressor is activated as a shock suppressor only when the piping system reaches a predetermined actuation velocity that is greater than the normal thermal movement of piping. If conditions immediately subsequent to a shock event cause thermal movement of the piping system, a lock-up condition could result. Since the bleed orifice is not of sufficient size to provide for both thermal movement and bleed-off of high pressure fluid, the poppet valve remains closed after a shock condition due to the unrelieved pressure. As a result, the suppressor remains in a checked or resistive mode after the shock event has passed, and the continued thermal movement induces high stresses in the piping system. This condition could cause a tentative failure or overstressed load condition on the piping system.

Figure 1:
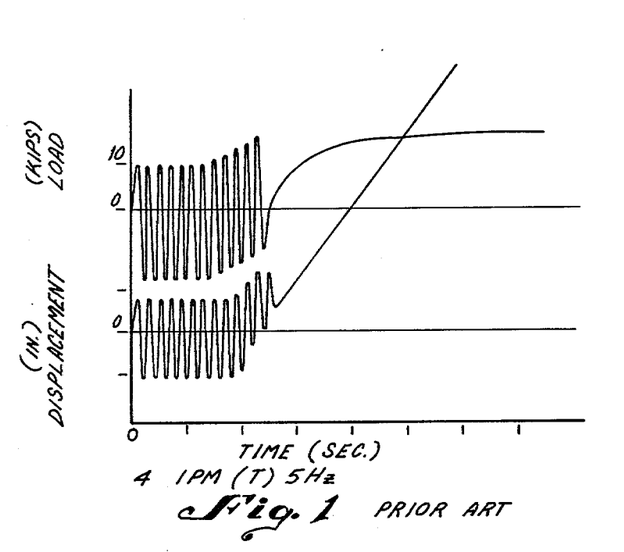
FIG. 1 is a graph showing the typical operating characteristics of a prior art device.

FIG. 1 illustrates the phenomenon that occurs when a poppet valve remains closed after a seismic event that is followed by continued thermal motion. The lower curve shows displacement in inches versus time and the upper curve shows the load exerted on the piping system versus time. A dynamic force at a frequency of 5 hertz and at rated load is applied to simulate a seismatic event, then a constant motion of 4 inches per minute is applied to the system to simulate thermal movement. A review of the curves will reveal that during the first second, only the seismic load was exerted on the system and the resulting limited oscillatory motion is illustrated. Subsequent to the application of the oscillating load, thermal movement in the form of a constant velocity input was imposed and it is seen how the displacement shifted linearly at the rate of the constant velocity input. The oscillating load was then removed and only the constant velocity thermal movement continued; however, it may be noted that the load continued to increase up to and beyond the rated load of the suppressor, placing undue stress on the piping system due to the suppressors remaining in a locked or rigid condition. This is a major problem towards which the present invention is directed.

SUMMARY OF THE INVENTION

The present invention contemplates a quick response hydraulic shock suppressor that presents low resistance to thermally induced movement and expansion in piping systems, while resisting movement of the piping system caused by shock and oscillating load conditions. A unique characteristic of the present invention is that the improved quick response hydraulic shock suppressor limits the velocity of piping systems during oscillatory loads and shocks whereas prior art devices either allowed movement as a function of internal pressure induced by external dynamic loads or presented a rigid strut without allowing for any movement.

Figure 2:
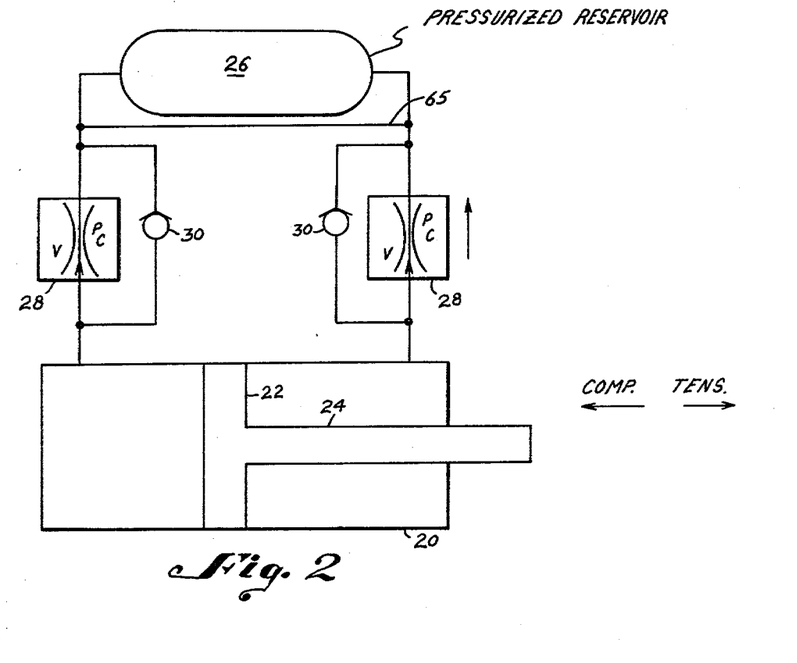
FIG. 2 is a flow schematic of the quick response hydraulic shock suppressor of the present invention.
Figure 3:
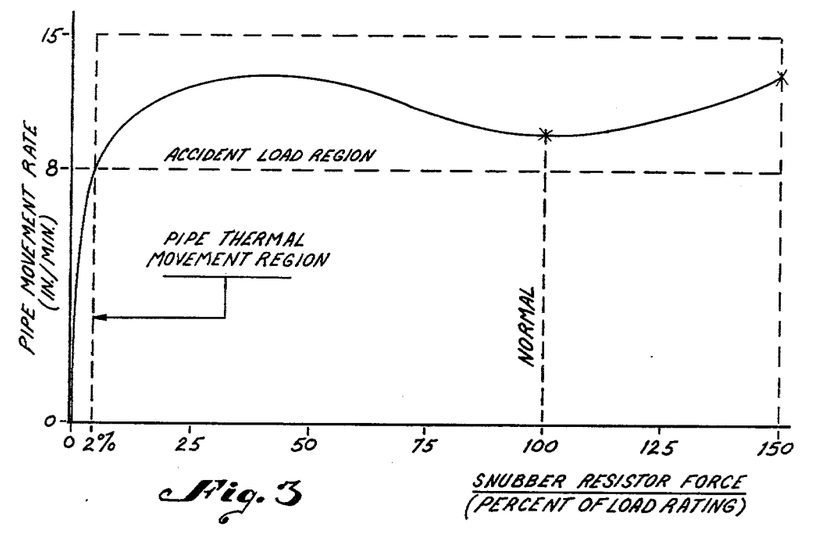
FIG. 3 is a graph showing the flow characteristics of the control valve used in the present invention.

The unique operating characteristic of the present invention is achieved through the use of a pressure-compensated variable orifice control valve which limits the velocity of movement to a somewhat fixed value as internal pressure rises with increasing external load. A schematic representation of the quick response hydraulic shock suppressor is shown in FIG. 2 where there is shown a double acting cylinder 20 having a piston 22 disposed therein and connected to a piston rod 24 which may be in either compression or tension as a result of an externally applied force. The piston divides the cylinder into a tensile side, i.e. the side with the piston rod, and a compressive side. Each side of the cylinder is connected to a pressurized reservoir 26 through parallel connections of temperature-compensated variable orifice control valves 28 and check valves 30. The quick response is achieved through the use of the pressure-compensated variable orifice control valve which quickly releases the internal residual pressure within the cylinder after high dynamic loads due to the increasing orifice size with cylinder depressurization. A typical characteristic for the control valve is shown in FIG. 3 where it is shown that for up to 2% of the suppressor rated load, the pipe movement rate or bleed rate of the valve is substantially linear, allowing substantially unrestrained thermal pipe movement. At 2% of rated load, the flow characteristic of the valve changes to a substantially constant flow rate up to 150% of the rated load, thereby providing for constant pipe velocity in the accident load region. Thus, the control valve is uniquely used to sense the difference between thermal movements and accident loads on piping systems.

Figure 4:
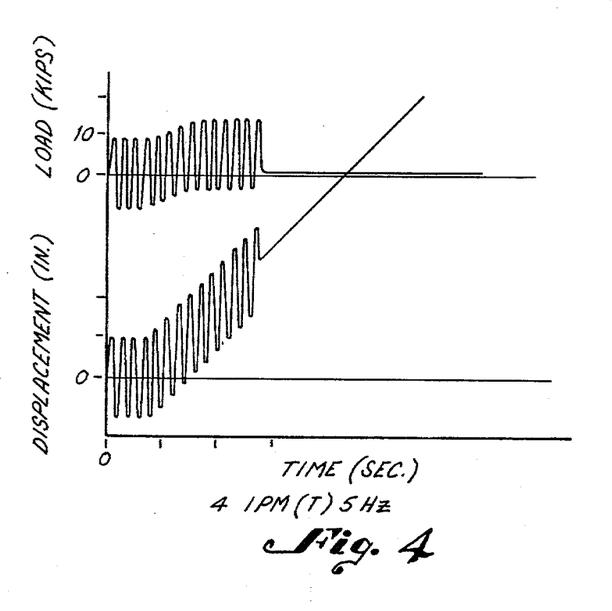
FIG. 4 is a graph showing the displacement characteristics of the present invention.

FIG. 4 illustrates the load versus displacement characteristics experienced with the quick response hydraulic shock suppressor when subjected to similar loads and displacements as shown in FIG. 1. A review of FIG. 4 will reveal that as the seismic load is removed and the thermal displacement is continued, the load is reduced to a substantially zero level without placing undue stress on the piping system as was experienced with the prior art device as shown in FIG. 1.

It is an objective of the present invention to provide a temperature stable control valve which will have the potential for restraining pipe movement only during dynamic or seismic events and immediately thereafter allow unrestrained thermal movement of piping systems without increasing the load on said system.

It is a further objective of the present invention to provide a hydraulic suppressor that does not require scheduled maintenance for seal replacement through the unique use of radiation and high temperature resistant seal materials and hydraulic fluid.

It is another objective of the present invention to provide the suppressor with a sealed pressurized hydraulic reservoir to eliminate problems with fluid contamination and attitude sensitivity. It is contemplated that this objective will be realized through the unique use of a metal bellows which will provide both a seal for the reservoir and a spring for pressurizing said reservoir.

It is another objective of the present invention to provide the suppressor with a unique lock-up indicator which will provide a visible indication when the system is in a locked or restraining condition.

The above mentioned and other features and objectives of this invention will become more apparent by reference to the following description taken in conjunction with the accompanying drawings.

DESCRIPTION OF THE PREFERRED EMBODIMENT

Figure 5:
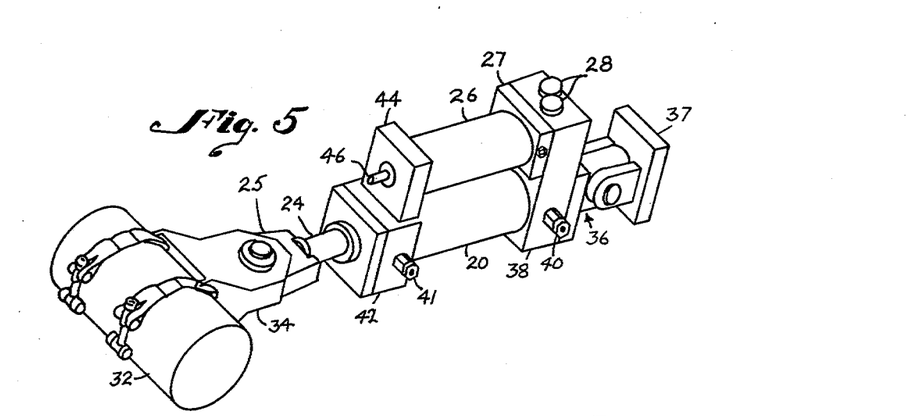
FIG. 5 is a perspective view showing the overall structure of the present invention.

The quick response shock suppressor of the present invention is shown in FIG. 5 having a double-acting hydraulic cylinder 20. Hydraulic cylinder 20 has a head 42 at one end with a piston rod 24 with a rod eye 25 extending therefrom for connection to a pipe 32 by way of a clamp 34. A cap 38 is provided on the opposite end of the cylinder and has a pivot mount 36 mounted thereto for connection to a building clevis bracket 37. A pair of control valves 28 and a lock-up indicator 40 are mounted in cap 38. A second lock-up indicator 41 is mounted in head 42. A pressurized fluid reservoir 26 has a cap 27 that is mounted to cap 38 of the hydraulic cylinder and a head 44 at the opposite end. Head 44 includes an opening through which extends a reservoir fluid level indicator rod 46. Not shown in FIG. 5 are a pair of elbows, each mounted to the rear sides of cap 38 and head 42 and a tube connecting said elbows for providing fluid flow communication between conduits formed in head 42 and cap 38.

Figure 6:
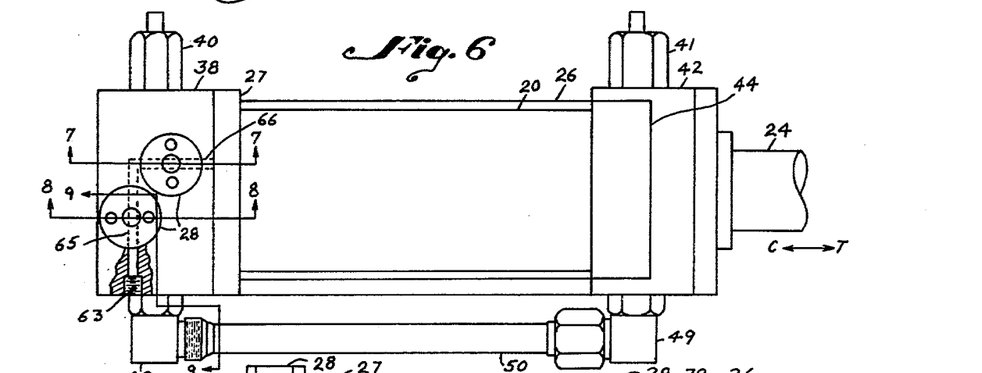
FIG. 6 is a top view of a portion of the present invention.

Referring to FIG. 6, there is shown a top view of a portion of the suppressor of FIG. 5 which clearly shows elbows 48 and 49 mounted to cap 38 and head 42 respectively and the connecting tube 50. There is also shown passages 65 and 66 which will be discussed subsequently. Passage 65 is closed with a press-sit plug 63.

Figure 7:
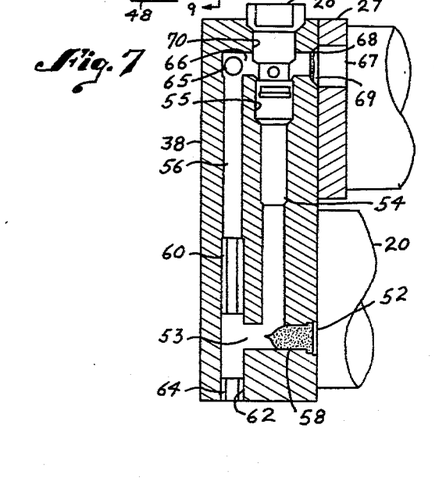
FIG. 7 is a sectional view taken along lines 7—7 of FIG. 6.

Referring to FIG. 7 there is shown a sectional view of cap 38 taken along lines 7—7 of FIG. 6. FIG. 7 illustrates the compression side valve porting for the hydraulic system. A port 52 is in communication with the compression side of hydraulic cylinder 20 and with a transverse passage 53 which is connected to two parallel passages 54 and 56 formed in cap 38. A filter screen 58 is disposed within port 52, said filter screen preferably having a 160 micron mesh. A check valve 60 is mounted in passage 56 and is positioned to block the flow of fluid from port 52 while allowing the flow of fluid towards port 52. The check valve may be of a cartridge type sold by The Lee Company. The check valve 60 may be inserted through a port 62 which is thereafter closed by a plug 64. Passages 54 and 56 each intersect a transverse passage 66 which is in communication with a port 68 connecting the passage to the reservoir through a port 67 formed in cap 27. A filter screen 69 preferably having a 160 micron mesh is disposed in port 68.

A port 70 is formed in cap 38 and includes a threaded opening for receiving a control valve 28, the innermost sealed end of which extends into a reamed passage 55. Control valve 28 controls the flow of hydraulic fluid through passage 54 so that fluid may enter the end of control valve 28 only at a controlled rate to be discharged into passage 66 and on into the reservoir 26. Thus, upon experiencing a compressive force on the piston rod 24, the fluid on the compression side of the hydraulic cylinder 20 will be under compression and will flow into port 52 through passages 53 and 54, through control valve 28 and partially into reservoir 26, and valve interconnecting passage 65, with the check valve 60 blocking flow of fluid through passage 56. When a tension force is placed on piston rod 24, the flow of fluid is reversed and flows into port 68 from the reservoir 26 and valve interconnecting passage 65 through passages 66 and 56, through check valve 60, passage 53 and port 52 and into the compression side of the hydraulic cylinder.

Figure 8:
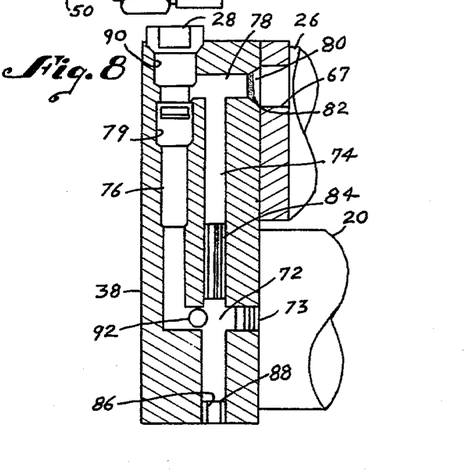
FIG. 8 is a sectional view taken along lines 8—8 of FIG. 6.

Referring now to FIG. 8, which is a sectional view taken along lines 8—8 of FIG. 6 and shows the porting arrangement for the tension side valving. A passage 72 is formed in cap 38, which passage has a plug 73 and is in communication with the tension side of the hydraulic cylinder 20 by way of the eblow 48, the connecting tube 50 and elbow 49. Passage 72 is connected to parallel passages 74 and 76, which passages are in communication with a transverse passage 78 which terminates at one end at a port 80. Port 80 communicates through port 67 with the reservoir 26. A filter screen 82 is disposed in the opening of port 80, said screen preferably having a 160 micron mesh. A cartridge-type check valve 84 is disposed in passage 74 to prevent the flow of fluid through passage 74 in a direction from passage 72 to passage 78, while allowing flow in the opposite direction. A port 86 is formed in the cap 38 through which check valve 84 may be inserted, said port being closed by plug 88. A threaded port 90 is formed in cap 38 for receiving a control valve 28 so that the sealed inlet end of control valve 28 extends into a reamed passage 79. The control valve 28 controls the rate of fluid flow through passage 76 in a direction from passage 72 to passage 78.

Figure 9:
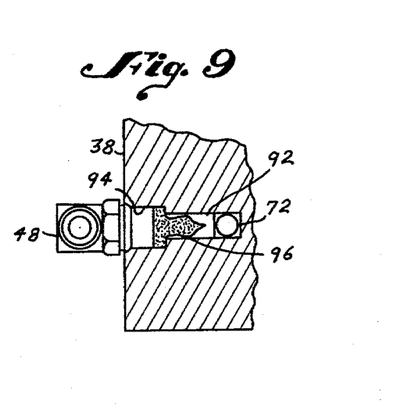
FIG. 9 is a sectional view taken along lines 9—9 of FIG. 6.

FIG. 9 is a cross-sectional view taken along lines 9—9 of FIG. 6 and shows a portion of cap 38 having a passage 92 formed therein in communication with passage 72 shown in FIG. 8. Passage 92 terminates in a threaded port 94 into which is inserted elbow 48, which elbow retains a filter screen 96 disposed within passage 92. Passage 92 is connected through the elbow 48, tube 50, elbow 49 and a passage, not shown, in head 42 with the tension side of the hydraulic cylinder 20. Thus, when the piston rod 24 is placed under tension, hydraulic fluid flows through the passage in head 42 through elbow 49, tubing 50, elbow 48, screen 96, passage 92, passage 72, passage 76, control valve 28, passage 78 and also reservoir 26 and valve interconnecting passage 65. When the rod is placed in compression, fluid flows out of reservoir 26 and valve interconnecting passage 65 through passage 78, passage 74, check valve 84, passage 72, passage 92, screen 96, elbow 48, tube 50, elbow 49, the passage in head 42 and on into the tension side of the hydraulic cylinder.

Figure 10:
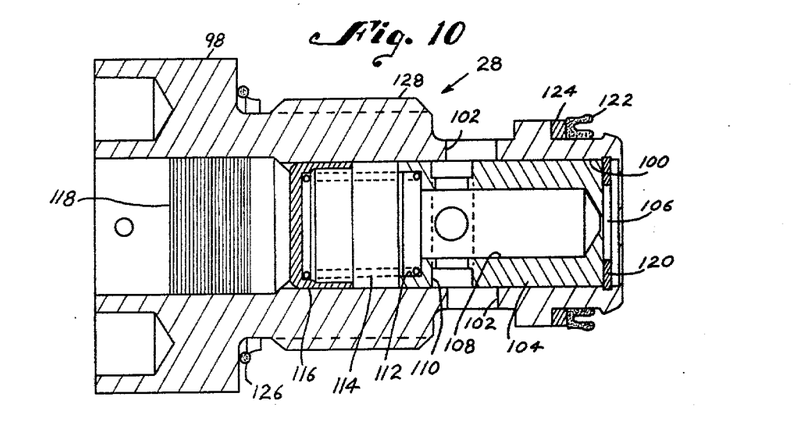
FIG. 10 is a sectional view of the control valve of the present invention.

Referring now to FIG. 10, there is shown a cross-sectional view of a control valve 28. The control valve 28 includes a body 98 having a bore 100 formed therethrough. Ports 102 are formed in body 98 communicating with bore 100. A piston 104 is slidably disposed in bore 100 and has an orifice 106 formed at one end thereof communicating with a hollow interior portion 108. A plurality of ports 110 are formed in the side of piston 104 and are in communication with the hollow interior 108. A recess 112 is formed in the end of the piston opposite the orifice 106 into which is seated one end of a spring 114, the opposite end of which is seated in an annular spring seat member 116. A plug assembly 118 is press fitted into the reamed end of bore 100 for abutting against the spring seat 116. Piston 104 is retained within the bore at the orifice end through the use of a retaining ring 120 which fits within an annular groove formed in the surface of bore 100. An annular seal assembly 122 and a back-up ring 124 are disposed about the orifice end of the body. Both the seal assembly and the back-up ring are formed of a radiation resistant self-lubricated seal material known as TEFZEL ™ manufactured by DuPont. Seal 122 provides a seal between the control valve body 98 and the surface of passage 55 or 79 formed in the cap 38. Another annular seal 126 is disposed about the plug end of the body 98 for forming a seal between the valve body and the outer surface of cap 38 when the valve 28 is disposed within port 70 or 90 and is threadably retained therein by the engagement of threads 128 with a threaded port 70 or 90 of the cap 38.

The control valve 28 is a pressure-compensated, variable orifice-type device, which pressure regulates the rate of flow of hydraulic fluid to a predetermined narrow range over a wide pressure range of 20 to 5,600 psi. The flow rate is metered as a function of pressure drop through the metering orifice 106 formed in the piston. The fluid flow through the metering orifice 106 induces a pressure drop and a resultant force on the piston, which force is resisted by the preload on spring 114. Once a threshold pressure drop of approximately 20 psi is developed across the piston's metering orifice, the piston will move against the spring force. Movement of the piston controls the size of the exit orifices formed by orifices 110 of the piston and 102 of the body. The flow rate of fluid through the exit orifice is thereby metered as a function of pressure drop across the piston's metering orifice 106 from pressures of 20 psi through 5,600 psi. Each of the control valves 28 is designed and precalibrated to predetermined flow rate requirements which in one example are equivalent to piston rod movements of 8 inches per minute with less than 20 psi pressure drop and a limiting velocity of between 8 and 15 inches per minute from 20 psi to 5,600 psi using a 200 centistoke viscosity fluid.

Figure 11:
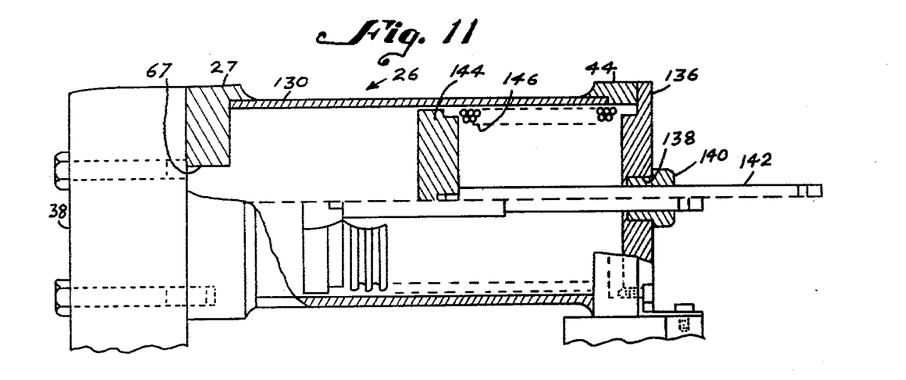
FIG. 11 is a partial section showing the reservoir of the present invention.

The hydraulic fluid reservoir 26 is shown in partial section in FIG. 11. The reservoir comprises a metal housing 130 welded to cap 27 and head 44. Cap 27 is mounted to cap 38 of the hydraulic cylinder and has a port 67 therethrough that is in communication with the ports 68 and 80 in cap 38. The head 44 has an annular opening formed therein, which opening is closed by a flanged end member 136 which is bolted to head 44. A threaded opening 138 is formed in the center of member 136 and threadedly receives an indicator rod guide 140 which has a bore formed therethrough into which is slidably mounted an indicator rod 142. The inner end of indicator rod 142 has a piston 144 attached thereto. A metal bellows 146 is brazed to piston 144 and the member 136 for providing a seal between the reservoir interior and the indicator rod opening. Member 136 is mechanically fastened with an intermediate gasket to head 44. The metal bellows 146 has an unstressed length as shown in the lower portion of FIG. 11 and upon entry of fluid under pressure into the reservoir, the bellows is compressed, thereby pressurizing the hydraulic fluid when the unit is sealed. As the fluid leaves the reservoir, the compressed metal bellows returns because of its preloaded condition. The indicator rod 142 provides a visual indication of the level of fluid in the reservoir. Thus, the reservoir is both hermetically sealed and pressurized by the metal bellows to prevent fluid contamination, internal corrosion of components and attitude sensitivity.

Figure 12:
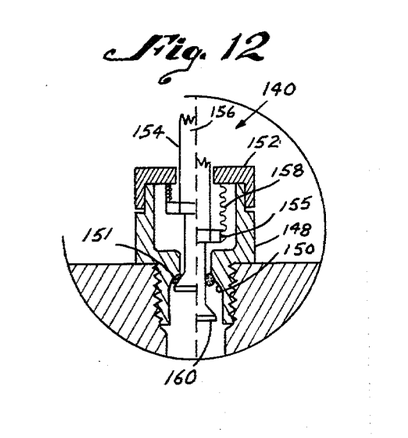
FIG. 12 is a sectional view showing the lock indicator of the present invention.

The lock-up indicators 40 are utilized for providing visual indications of pressures in the tension and compression sides of the hydraulic cylinder of greater than 100 psi so that greater than 8 in/minute pipe movements can easily be identified or excessive resistance to thermal pipe movement. Referring to FIG. 12, there is shown a sectional view of the lock-up indicator 40, with the indicator being shown in the locked and unlocked positions on left and right sides respectively of the figure. The indicator comprises a body 148 which is threadably mounted into a port formed in one of either the cap 38 or head 42, said body having an opening formed therethrough. A valve seating surface 150 is formed by the surface of said opening. The body includes an outer threaded portion for receiving a threaded cap 152. Said cap has a central opening 154 formed therein through which is disposed an indicating rod 156. A metal bellows 158 is secured at one end to a blind end 155 and at the opposite end to the cap 152 to provide a seal therebetween. The indicator rod 156 is also brazed to the blind end 155. The metal bellows 158 functions both as a seal and as a spring for holding the indicator rod 156 in a retracted position as shown in the righthand side of FIG. 12. At the inner side of the blind end 155, there is attached a poppet valve head 160 which is threaded into the blind end and seats against the valve seating surface 150 and fluid O'ring seal 151 when the indicator rod is in the extended position as shown in the left half of FIG. 12. The metal bellows are calibrated to collapse under a pressure of 100 psi, at which time the indicator rod will be fully extended and the poppet valve head will engage the seat 150 and seal 151, thereby isolating the metal bellows from higher pressures that may result with the hydraulic cylinder.

Thus, when an accident occurs, such as pipe failure, earthquake or sudden shock, the poppet closes when the cylinder pressure exceeds 100 psi, causing the bellows to compress and the indicator rod 156 to extend above the cap 152, thereby providing an indication that the locked condition exists. After the accident, the cylinder pressure normally immediately decreases to less than 100 psi and the bellows expands, opening the poppet valve and moving the indicator rod down towards the surface of cap 152 indicating the unlocked condition. In the event of a pipe movement rate greater than 8 in/min or a snubber malfunction which results in excessive resistance to pipe thermal movement, the indicating rod will remain extended, thereby signalling the condition.

As previously mentioned, the resilient seals used in the suppressor are formed of a radiation resistant material manufactured by DuPont known as TEFZEL TM, and the non-resilient seals are made of soft metal and are also radiation-resistant. The hydraulic cylinder 20 may be similar to a Miller Fluid Power Corporation type H cylinder utilizing TEFZEL TM seals and Grover's metallic piston rings. The control valves 28, check valves and plugs may be similar to those sold by The Lee Company.

Thus, the present invention provides a quick response hydraulic shock suppressor that may withstand high temperature operation and nuclear radiation without periodic maintenance and provides for thermal movement up to 8 inches per minute with a resistance of less than 2% of the nominal rated load while restricting the movement to less than 15 inches per minute for loads up to 150% rated load. The suppressor also includes a hermetically sealed pressurized fluid reservoir utilizing a metal bellows to provide both the hermetic seal and the pressurizing force, thereby preventing contamination of the fluid. Lock-up indicators are provided to give a visual indication of a suppressor high resistance due to excessive pipe movement rates or a malfunction of the snubber which results in excessive resistance to pipe thermal movement rates.

While the above description is that of the preferred embodiment of the present invention, it is contemplated that the invention may be practiced in many different embodiments utilizing both single and double acting hydraulic cylinders, some of which are illustrated in FIGS. 13–16. It is also contemplated that the relative positions and locations of the control valve and check valves may vary considerably depending upon the relative locations of the various components described. An important consideration in the practice of the present invention is that of achieving the quick response that is realized through the unique use of the pressure-compensated variable orifice control valve.

Figure 13:
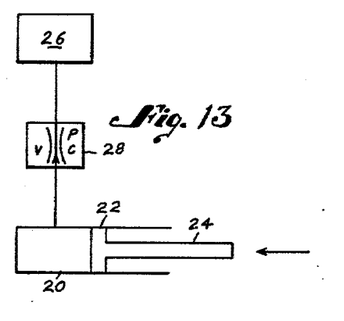
FIGS. 13–16 are flow schematics of alternate embodiments of the present invention.

In FIG. 13 there is shown a single acting cylinder 20 having a piston 22 and a rod 24 attached thereto for a compressive stroke only. During a compressive stroke, fluid flows through a control valve 28 into a reservoir 26.

Figure 14:
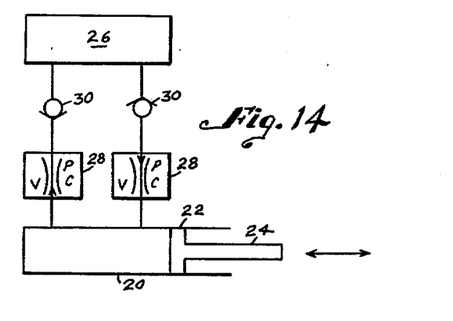

FIG. 14 illustrates a device that acts in both directions wherein fluid flows out of the cylinder through a first series connection of a control valve and a check valve upon a compressive stroke and back into the cylinder upon a tension stroke through a second series connection of a control valve and a check valve.

Figure 15:
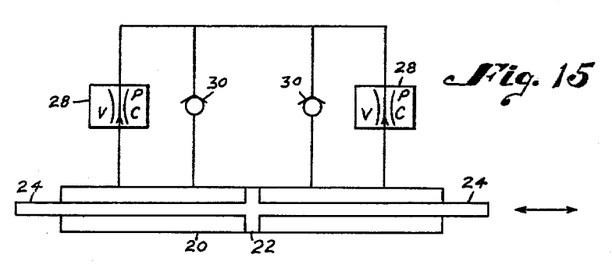

FIG. 15 illustrates a device somewhat similar to that of FIG. 2 wherein the reservoir has been eliminated and a second piston rod added on the other side of the piston so that the fluid displaced from one side of the cylinder equals the fluid drawn into the other side. This device is limited only in that extreme thermal expansion of the fluid could cause fluid leakage and therefore consideration must be given to the temperature range to which the fluid will be exposed.

Figure 16:
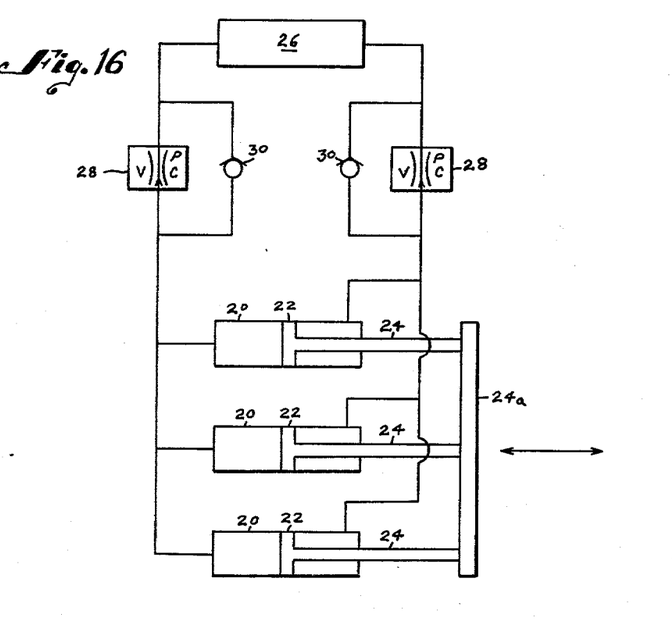

FIG. 16 illustrates a multi-cylinder device that may be used for extremely high load conditions beyond the capability of single cylinders. The rods 24 are connected to a single member 24a against which the load is excited.

What is claimed is:

1. A hydraulic shock suppressor for controlling the rate of movement of a supported system relative to a supporting structure, comprising:
   a hydraulic cylinder;
   a piston disposed for relative movement within said cylinder defining a fluid chamber, one of said cylinder and piston being adapted to be connected to the supported system and the other being adapted to be connected to the supporting structure;
   a port formed in said fluid chamber; and
   control valve means for controlling the rate of hydraulic fluid flow through said port in response to the pressure of hydraulic fluid in said chamber and the resultant pressure drop across said control valve means created by force applied to said piston and cylinder tending to cause their relative movement, wherein said control valve means includes means for passing fluid through said port at a rate that varies directly with the applied force and resultant pressure drop across said control valve means for forces up to a first level and means responsive to the pressure drop across said control valve means for maintaining the fluid flow rate through said port substantially constant within predetermined limits for applied forces up to a substantially higher second level, whereby the supported system may move slowly with little restriction when forces below the first predetermined level are applied but is restricted to a rate of movement within a predetermined range when higher forces are applied up to said second predetermined level.

2. A hydraulic shock suppressor as defined in claim 1, wherein the piston divides the cylinder into first and second fluid chambers each having a port formed therein and a pair of control valve means are provided, one associated with each of said first and second fluid chambers of said cylinder.

3. A hydraulic shock suppressor as defined in claim 1, wherein the control valve means controls the flow of fluid exiting from the fluid chamber.

4. A hydraulic shock suppressor as described in claim 2, additionally comprising means communicating said first and second fluid chambers of said cylinder wherein said control valve means are disposed in said communicating means.

5. A hydraulic shock suppressor as described in claim 1, additionally comprising:
   a second port formed in the fluid chamber;
   a second control valve means for controlling the flow of fluid through said second port; and
   check valve means associated with each control valve means for preventing the flow of fluid through said control valve means in a predetermined direction, whereby fluid flow into the chamber is controlled by one control valve and flow from the chamber is controlled by the other control valve.

6. A hydraulic shock suppressor as described in claim 4, additionally comprising check valve means associated with each control valve means for bypassing fluid flowing in a predetermined direction around said control valve means.

7. A hydraulic shock suppressor as described in claim 1, additionally comprising a reservoir in communication with said fluid chamber, said control valve means being disposed between the reservoir and the fluid chamber.

8. A hydraulic shock suppressor as described in claim 2, additionally comprising a reservoir in communication with at least one of said first and second fluid chambers.

9. A hydraulic shock suppressor as described in claim 4, additionally comprising a reservoir in communication with the communicating means at a position between said control valve means.

10. A hydraulic shock suppressor as described in claim 1, wherein the control valve means comprises a pressure-compensated variable orifice control valve having:
    a valve body having an opening; and
    a valve member mounted in said valve body and having an orifice of predetermined size forming a fluid flow path connecting said opening and said fluid chamber port, wherein said valve member cooperates with said opening to form a valve port that decreases in size when said valve member moves towards a second position from a first position and said valve member is biased toward said first position.

11. A hydraulic shock suppressor as described in claim 7, wherein the reservoir is hermetically sealed and pressurized.

12. A hydraulic shock suppressor as described in claim 1, additionally comprising means for providing indicia of the existence of pressure in the hydraulic cylinder over a predetermined level.

13. A hydraulic shock suppressor as described in claim 11, wherein the pressurized and hermetically sealed reservoir includes a bellows means that functions to seal said reservoir and maintain the hydraulic fluid under pressure.

14. A hydraulic shock suppressor as described in claim 13, additionally comprising indicating means associated with said bellows for providing an indication of the volume of fluid in said reservoir.

15. A hydraulic shock suppressor as described in claim 1, wherein the control valve means permits a continuous flow of hydraulic fluid from the fluid chamber at a rate at least corresponding to the thermal displacement of the support system.

16. A hydraulic shock suppressor as described in claim 1, wherein the control valve means permits a fluid flow rate corresponding to applied force for forces up to approximately 2% of the rated load of the suppressor and thereafter said control valve means restricts fluid flow rates to a value within a predetermined range for forces in an approximate range of 2% of rated load to 150% rated load.

17. A hydraulic shock suppressor as described in claim 12, wherein said indicia means includes a spring bellows means for urging an indicator into a retracted position and for providing a seal for the hydraulic fluid, said bellows being subjected to the fluid and calibrated to collapse and allow the indicator to become visible upon the application of the predetermined pressure level by the fluid.

18. A hydraulic shock suppressor as described in claim 17 wherein the indicator has associated therewith valve means for exposing said spring bellows to pressure in said fluid chamber below said predetermined pressure level and for closing upon providing an indication and thereby providing an indication and thereby providing isolation between the fluid and said spring bellows so the bellows is protected from high pressure levels that could rupture the bellows.

19. A hydraulic shock suppressor for controlling the motion of a supported system relative to a supporting structure, comprising:
   a hydraulic cylinder divided into first and second sides by a piston disposed for relative movement within said cylinder, said cylinder and piston each being adapted to be connected to one of said supported systems on said support structure;
   a reservoir;
   means for communicating said first and second sides of the cylinder and said reservoir; and
   control valve means disposed in said communicating means for controlling the rate of hydraulic fluid flow in a communicating means associated with each of the cylinder sides in response to the pressure of the hydraulic fluid in the associated side and the resultant pressure drop across control valve means created by force applied to said piston and cylinder tending to cause their relative movement, wherein said control valve means includes means for passing fluid through said port at a rate that varies directly with the applied force and resultant pressure drop across said control valve means for forces up to a first level and means responsive to the pressure drop across said control valve means for maintaining flow rate through said port substantially constant within predetermined limits for applied forces up to a substantially higher second level, whereby the supported system may move slowly with little restriction when forces below the first predetermined level are applied but is restricted to a rate of movement within a predetermined range when higher forces are applied up to said second predetermined level.

20. A hydraulic shock suppressor as described in claim 19, additionally comprising check valve means associated with each control valve means for bypassing fluid flowing in a predetermined direction around said control valve means.

21. A hydraulic shock suppressor as described in claim 19, whereby the control valve means comprises a pressure-compensated variable orifice control valve having:
   a valve body having an opening; and
   a valve member mounted in said valve body and having an orifice of predetermined size forming a fluid flow path connecting said opening and said fluid chamber port, wherein said valve member cooperates with said opening to form a valve port that decreases in size when said valve member toward a second position from a first position and said valve member is biased toward said first position.

22. A hydraulic shock suppressor as described in claim 19, wherein the reservoir is hermetically sealed and pressurized.

23. A hydraulic shock suppressor as described in claim 19, additionally comprising means for providing an indicia of the existence of pressure in the hydraulic cylinder over a predetermined level.

24. A hydraulic shock suppressor as described in claim 22, wherein the pressurized and hermetically sealed reservoir includes a bellows means that functions to seal said reservoir and maintain the hydraulic fluid under pressure.

25. A hydraulic shock suppressor as described in claim 24, additionally comprising indicating means associated with said bellows for providing an indication of the volume of fluid in said reservoir.

26. A hydraulic shock suppressor as described in claim 23, wherein said indicia means includes a spring bellows means for urging an indicator into a retracted position and for providing a seal for the hydraulic fluid, said bellows being subjected to the fluid and calibrated to collapse and allow the indicator to become visible upon the application of the predetermined pressure level by the fluid.

27. A hydraulic shock suppressor as described in claim 26, wherein the indicator has associated therewith valve means for exposing said spring bellows to pressure on said fluid chamber below said predetermined pressure level and for closing upon providing an indication and thereby providing isolation between the fluid and said spring bellows so the bellows is protected from high pressure levels that could rupture the bellows.

28. A hydraulic shock suppressor as described in claim 19, wherein the control valve means permits a continuous flow of hydraulic fluid at a rate at least corresponding to the thermal displacement of the supported system.

29. A hydraulic shock suppressor as described in claim 19, wherein the control valve means permits a fluid flow rate corresponding to applied force for forces up to approximately 2% of the rated load of the suppressor and thereafter said control valve means restricts fluid flow rates to a value within a predetermined range for forces in an approximate range of 2% of rated load to 150% of rated load.

30. A hydraulic shock suppressor for controlling the motion of a supported system relative to a supporting structure comprising:
   a hydraulic cylinder divided into first and second sides by a piston disposed for relative movement within said cylinder, said cylinder and piston each being adapted to be connected to one of said support system and said supporting structure;
   a reservoir;
   first and second means for communicating said first and second sides of the cylinder with said reservoir;
   check valve means in said first and second means for permitting hydraulic fluid to flow from the cylinder sides to the reservoir in response to the pressure of the hydraulic fluid in the associated side and resultant the pressure drop across said control valve means created by force applied to said piston and cylinder, wherein said control valve means for passing fluid through said port at a rate that varies directly with the applied force and resultant pressure drop across said control valve means for forces up to a first level and means responsive to the pressure drop across said control valve means for maintaining the fluid flow rate through said port substantially constant within predetermined limits for applied forces up to a substantially higher second level, whereby the supported system may move slowly with little restriction when forces below the first predetermined level are applied, but is restricted to a rate of motion within a predetermined range when higher forces are applied up to a second predetermined level.

31. A hydraulic shock suppressor as described in claim 30, wherein the hydraulic cylinder is mounted between a cap member and a head member and said reservoir is mounted to said cap member, one of said first and second means being disposed entirely within said cap member and the other of said first and second means includes a conduit connecting said head member and said cap member.

32. A hydraulic shock suppressor as described in claim 31, wherein the control valves and check valves are mounted within said cap member.

33. A hydraulic shock suppressor as described in claim 32, wherein the check valves are mounted within passages formed in said cap member.

34. A hydraulic shock suppressor as described in claim 2 wherein the piston has a pair of rods attached thereto and extending from the cylinder in opposite directions.

35. A hydraulic shock suppressor as described in claim 1, comprising:
 a plurality of hydraulic cylinders each structurally interconnected;
 a plurality of pistons each structurally interconnected; and
 a port formed in each fluid chamber and connected to said control valve means.

* * * * *